United States Patent [19]
Carlsson et al.

[11] Patent Number: 5,974,322
[45] Date of Patent: Oct. 26, 1999

[54] METHOD AND APPARATUS FOR PLACING A FIXED-SITE TRANSCEIVER INTO SERVICE IN A WIRELESS COMMUNICATION NETWORK

[75] Inventors: Göran Carlsson, Stenhamra; Marie Lambertsson, Solna, both of Sweden

[73] Assignee: Telefonaktiebolaget L/M Ericsson (publ), Stockholm, Sweden

[21] Appl. No.: 08/566,553

[22] Filed: Dec. 4, 1995

[51] Int. Cl.$^6$ .................................................. H04Q 7/00
[52] U.S. Cl. .......................... 455/446; 455/423; 455/561
[58] Field of Search .................................. 455/56.1, 53.1, 455/33.1, 54.1, 423, 422, 446, 445, 449, 453, 524, 561; 379/59, 58

[56] References Cited

U.S. PATENT DOCUMENTS

| | | |
|---|---|---|
| 4,730,187 | 3/1988 | Menich et al. . |
| 4,771,448 | 9/1988 | Koohgoli et al. . |
| 4,965,850 | 10/1990 | Schloemer . |
| 5,123,112 | 6/1992 | Choate . |
| 5,212,804 | 5/1993 | Choate . |
| 5,295,178 | 3/1994 | Nickel et al. . |
| 5,363,428 | 11/1994 | Nagashima . |
| 5,422,930 | 6/1995 | McDonald et al. . |
| 5,475,870 | 12/1995 | Weaver, Jr. et al. ................... 455/67.1 |

OTHER PUBLICATIONS

Schmidt et al, "GSM Operation And Maintenance", Electrical Communication, Jan. 1, 1993, Paris, FR, pp. 164–171.

E.H. Schmid and M. Kähler, *GSM Operation and Maintenance*; 1225 Electrical Communication (1993) 2nd Quarter, Paris, France, pp. 164–171.

The Article "RBS 884 A New Generation Radio Base Stations for the American Standard", Ericsson Review, vol. 71, No. 1, Jan. 1, 1994, Stockholm, SE, pp. 4–13.

*Primary Examiner*—Andrew Faile
*Assistant Examiner*—Christopher Onuaku
*Attorney, Agent, or Firm*—Jenkens & Gilchrist, P.C.

[57] ABSTRACT

An apparatus and method for automatically placing a fixed-site transceiver into service once installed in a wireless communication network, such as a cellular communication network. Configuration data is stored at a memory device. When the fixed-site transceiver is powered-on, the configuration data stored at the memory device is retrieved, and downloaded to set the parameters required for operation of the base station.

17 Claims, 5 Drawing Sheets

METHOD AND APPARATUS FOR PLACING A FIXED-SITE TRANSCEIVER INTO SERVICE IN A WIRELESS COMMUNICATION NETWORK

TECHNICAL FIELD OF THE INVENTION

The present invention relates generally to a wireless communication system, such as a cellular communication system, having a fixed-position network including a plurality of spaced-apart, fixed-site transceivers. More particularly, the present invention relates to apparatus and method for placing a fixed-site transceiver into service once the fixed-site transceiver is installed in the fixed network.

BACKGROUND OF THE INVENTION

Utilization of wireless communication systems to communicate telephonically has achieved wide popularity in recent years. Because a wireline connection is not required to effectuate telephonic communication, communication by way of a wireless communication system is possible at a location to which formation of a wireline connection would be impractical or impossible.

A cellular communication system is a type of wireless communication system. When the infrastructure, hereinafter referred to as the network of the cellular communication system, is installed in a geographical area, a subscriber to the cellular system is generally able to communicate telephonically in the system when positioned at any location in the geographical area encompassed by the system.

Cellular communication networks, have been installed throughout significant portions of the world. Large numbers of subscribers to cellular communication systems formed of such cellular networks are able to communicate telephonically when positioned in areas encompassed by such cellular networks. Telephonic communication of both voice and data is typically permitted.

As increased numbers of subscribers make greater usage of cellular networks, during certain time periods and in certain areas, utilization of existing cellular networks has reached their maximum capacities. Capacity problems are sometimes first evident in areas of the cellular network positioned along highly-traveled roadways, particularly during morning and evening rush periods and in urban areas of significant population densities.

When a cellular network is operated at its maximum capacity, additional users desiring to utilize the cellular network are sometimes prohibited from accessing the network until those utilizing the cellular network terminate their communications therethrough.

Various measures have been proposed and implemented by which to increase the capacities of existing cellular communication networks.

For instance, some networks have been converted to permit their usage in an analog, narrowband, cellular system. In a narrowband system, the bandwidths of the transmission channels upon which signals are transmitted between a fixed-site transceiver and a remotely-positioned mobile terminal (i.e., the cellular phone) are reduced relative to the bandwidths of the transmission channels of a conventional, cellular communication network. Due to the reduced bandwidths of the transmission channels, a greater number of transmission channels are defined within the frequency band allocated for cellular communications.

To implement a narrowband system, however, the circuitry of the fixed infrastructure of a conventional, cellular communication network must be converted to permit its operation in a narrowband system. Mobile terminals (i.e., the cellular telephones) operable in the conventional network must similarly be converted to permit their usage in a narrowband system. Such conversion is relatively costly and typically requires substitution or replacement of existing circuitry with circuitry operable in the narrowband system.

Some other networks have been converted to permit the transmission and reception of digitally-modulated signals transmitted pursuant to a digital modulation technique in a digital, cellular system.

Use of a digital modulation technique permits efficient utilization of the transmission channels of the frequency band allocated for cellular communications. By utilizing a digital modulation technique, a single frequency channel can be used, e.g., by utilizing a time division multiplexing technique, to transmit more than one signal upon a single transmission channel. A several-fold increase in the capacity of a cellular communication network operable in a digital system over that of a conventional, cellular communication system is typically possible. To implement a digital system, however, the circuitry of the fixed infrastructure of a conventional, cellular communication network must be converted to permit its operation in the digital system. Mobile terminals operable in the conventional network must similarly be converted to permit their usage in the digital system. Such conversion is also relatively costly and typically requires the replacement of existing circuitry.

While both of such aforementioned manners by which to increase the capacity of a cellular communication network are well able to provide a significant increase in the capacity of the cellular communication network, the aforementioned manners by which to increase the capacity of the network permits such increase only at significant expense.

As mentioned previously, the density of usage of a cellular communication network is typically not uniform, but rather varies, for instance, according to the time-of-day and the position at which usage of the network is attempted.

When the capacity problems are primarily localized at particular portions of the geographical area encompassed by the cellular network, another manner by which to increase the capacity of the cellular communication network is sometimes utilized. By adding an additional fixed-site transceiver to the network, the capacity of the network is effectively increased.

By appropriate selection of the position at which the additional, fixed-site transceiver is located, areas of the cellular communication network which exhibit the greatest densities of usage, the capacity of the communication network can be most effectively increased. By including a plurality of additional, fixed-site transceivers to the cellular network, the capacity of the network can, at times, be correspondingly increased.

When an additional, fixed-site transceiver is added to an existing, cellular communication network, the transceiver is installed by making appropriate physical, or other, connections with the other infrastructure of the network. After installation, the fixed-site transceiver can be placed into service. To place the additional, fixed-site transceiver into service, however, the transceiver must be initialized with configuration data. For instance, various parameters of the transceiver must first be set. Parameters pertaining to, e.g., power levels at which signals generated by the transceiver are to be transmitted, bit rates of the transmitted signals, and received signals, all must be set.

Conventionally, to place the additional, fixed-site transceiver into service, technically-trained, operating personnel have been required to set the parameters of the personnel have been required to set the parameters of the additional, fixed-site transceiver. The need to utilize skilled personnel to set the parameters of the base station is, typically, fairly-costly. The personnel required to set the parameters must be technically-skilled, and the costs of such personnel can be quite significant.

A manner by which to place a fixed-site transceiver into service without requiring technically-skilled personnel to manually set the transceiver parameters would therefore be desirable.

It is in light of this background information related to wireless communication networks that the significant improvements of the present invention have evolved.

SUMMARY OF THE INVENTION

The present invention advantageously provides apparatus and method for automatically placing a fixed-site transceiver into service once the fixed-site transceiver is installed in a cellular, or other wireless, communication network.

Because the fixed-site transceiver can be automatically placed into service, manual start-up procedures conventionally required to be performed by highly-skilled, technical personnel prior to placement of the fixed-site transceiver into service are obviated. As the use of such personnel is not required, costs previously required for the use of such personnel need not be expended. Additionally, delays which sometimes occur if the personnel are unable to immediately perform the start-up procedures to place the fixed-site transceiver into service are avoided.

Implementation of the various embodiments of the present invention facilitates the placement into service of a fixed-site transceiver added to an existing cellular, or other wireless, communication network. Implementation of the various embodiments of the present invention also facilitates the placement into service of the transceivers of a newly-created cellular, or other wireless, communication network.

In accordance with these and other aspects, apparatus, and an associated method, places a fixed-site transceiver into service once installed in a wireless communication network. The wireless communication network includes a switching center coupled to a fixed-site transceiver. The fixed-site transceiver communicates with a remotely-positioned, wireless communication station. A memory device stores configuration data required to initialize operation of the transceiver circuitry in the wireless communication network. Communication is permitted with the remotely-positioned communication station. An initializer is coupled to the memory device to retrieve the configuration data stored therein. The initializer initializes the fixed-site transceiver with the configuration data responsive to an initialization request. The fixed-site transceiver is operative, once initialized with the configuration data, to transmit the signals to, and to receive the signals from, the wireless communication station.

In one embodiment, the fixed-site transceiver is initialized responsive to powering-up of the transceiver after the transceiver is installed in the wireless communication network. Such nearly-immediate placement into service of the fixed-site transceiver avoids the need for technical personnel to manually perform the start-up procedures to place the transceiver into service.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
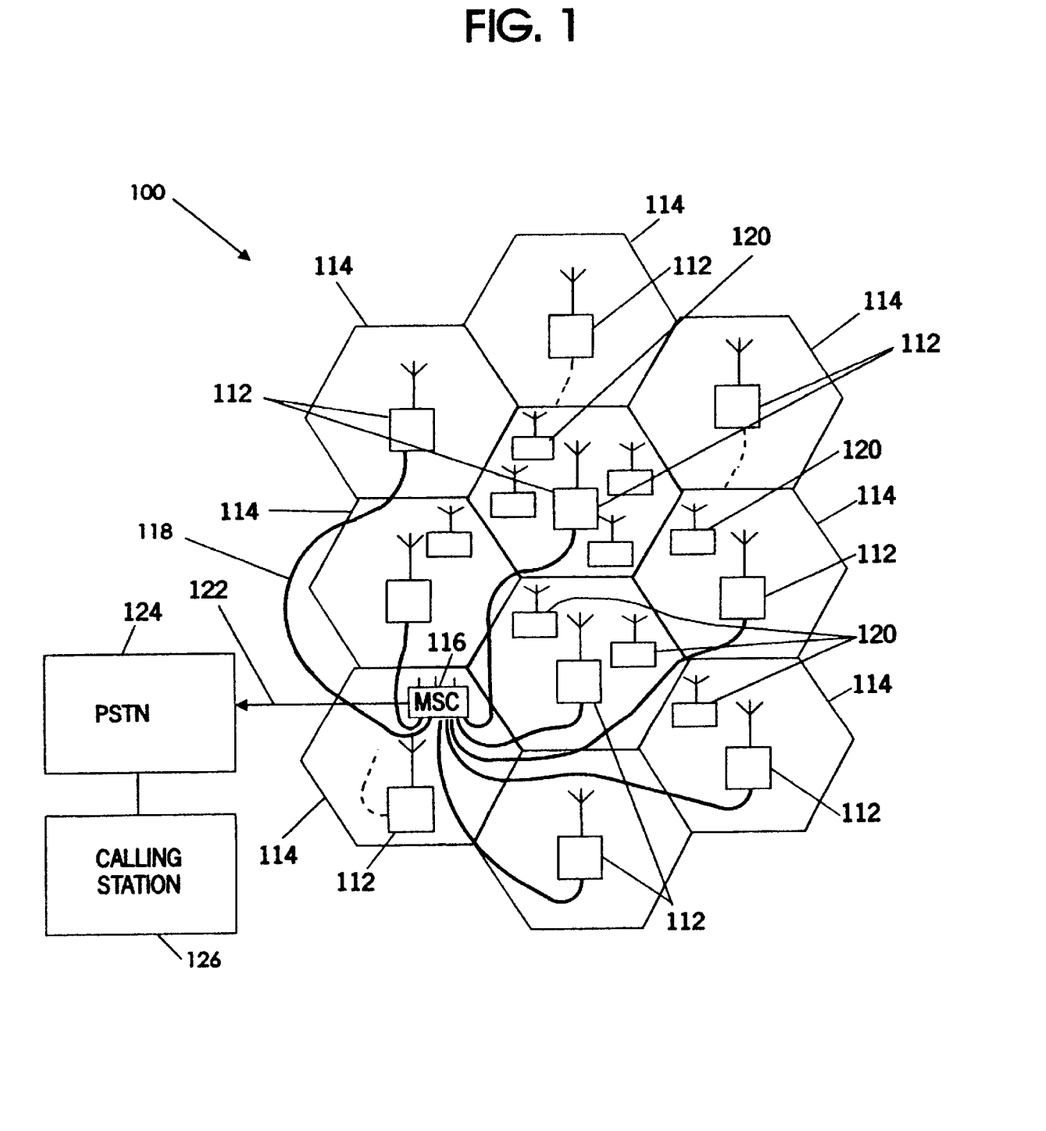
FIG. 1 is a graphical representation of a cellular communication network to which a fixed-site transceiver including an embodiment of the present invention can be added.

FIG. 1 illustrates a cellular communication system, shown generally at 100, of which various embodiments of the present invention may form portions. While FIG. 1 illustrates a cellular communication system and the following description of exemplary embodiments of the present invention are described with respect to the cellular communication system 100, it should be understood that the teachings of the present invention may be embodied in other wireless communication systems.

The cellular communication system 100 includes a plurality of spaced-apart radio base stations 112. The radio base stations 112 are positioned, for purposes of illustration, at equally spaced-apart locations throughout a geographic area. It should also be noted that, in a typical cellular communication system, the positions at which the radio base stations 112 are located are determined, e.g., as a result of anticipated density of usage of the cellular communication system, zoning limitations, and geographical limitations. The radio base stations are fixed-site transceivers maintained in a fixed position and are capable of transmitting and receiving radio frequency signals generated during operation of the cellular communication system.

Portions of the geographical area positioned proximate to each of the radio base stations 112 form cells 114. For purposes of illustration again, each of the cells 114 is shown to be similarly-sized. As the radio base stations of an actual cellular communication system are not necessarily positioned at equally, spaced-apart locations and because the sizes of the cells are typically dynamic and determined during actual operation of the cellular communication system, the dimensions of the cells 114 shown in FIG. 1 are exemplary only.

The radio base stations 112 are each coupled to a mobile switching center 116. The mobile switching center 116 is formed of, or includes, a telephonic exchange, and the couplings between the radio base stations 112 and the MSC 116 are indicated in the figure by lines 118.

Mobile stations (i.e., cellular telephones) 120 positioned within the geographic area encompassed by the cellular communication system 100 are able to communicate telephonically with selected radio base stations in conventional manner.

The MSC 116 is coupled in conventional manner, here indicated by the lines 122, to a public service telephone network (PSTN) 124. The PSTN 124 is coupled, in conventional manner, to calling stations, of which a single calling station 126 is illustrated in the figure. The calling station 126 may, for example, be formed of a wireline, telephonic device or any other device capable of transmission and reception of communication signals by way of the PSTN 124.

The radio base stations 112, the mobile switching center 116, and the couplings therebetween, shall at times below be referred to as the cellular network or infrastructure of the cellular communication system.

Once the infrastructure of the cellular communication system 100 has been installed throughout a geographical area and placed into service, two-way communication is permitted between a radio base station 112 and a mobile station 120 positioned at any location within the geographical area encompassed by the cellular communication system 100. A plurality of mobile stations 120 are illustrated in the figure, positioned in various ones of the cells 114.

In general, when a mobile station 120 is operated in the system 100 to communicate with a radio base station 112, the mobile station communicates with the radio base station in whose cell 114 in which the mobile station is positioned. A cellular communication system, such as the system 100, is advantageous as wireless communication is permitted between a mobile station and a radio base station of the cellular network whenever the mobile station is positioned within the geographical area encompassed by the cellular network. Additionally, continued communication with the mobile station is permitted as the mobile station is repositioned out of the cell associated with one of the radio base stations and into a cell associated with another of the base stations. "Hand-off" procedures effectuated at the MSC 116 and relevant ones of the base stations 112 provide for the transfer of communications between the mobile station and a desired one of the radio base stations 112.

As mentioned above, there have been significant increases in the utilization of many existing, cellular communication systems. Decreasing costs, wider availability, and greater recognition of the convenience of utilization of a cellular communication system are all reasons for which such increase in the utilization of a cellular communication system has occurred.

In some instances, utilization of cellular communication systems has reached the maximum capacity of some of such cellular communication systems. The capacity problems are typically most apparent during morning and evening rush periods along well-traveled roadways and in densely-populated, urban areas.

As also mentioned previously, one manner by which to increase the capacity of a cellular communication system is to increase the number of radio base stations of which the infrastructure of the cellular system is formed. When an additional base station is installed and placed into service, a mobile station positioned within the vicinity thereof can communicate with the additional radio base station. By installing the additional base stations at locations of the geographical area encompassed by an existing cellular communication network in which capacity problems are most significant, the capacity problems can be alleviated.

Conventionally, however, once an additional base station has been installed in position, technically-trained personnel are required to place the additional base station into service into the cellular communication network. The personnel are required to initialize the base station with configuration data. For instance, such personnel are required to set parameters of operation of the base station, both to send, and to receive radio frequency signals at selected data rates and at selected signal strengths. The need to utilize technically-trained personnel to place the additional base station into service is costly and, typically, also time-consuming.

FIG. 2 again illustrates the cellular communication system 100. The fixed network of the communication system 100 is again shown to include a plurality of radio base stations 112, each of which defines a cell 114. And, the radio base stations 112 are all coupled to a mobile switching center (MSC) 116. Such coupling is indicated again in the figure by the lines 118 extending between the radio base stations 112 and MSC 116.

Figure 2:
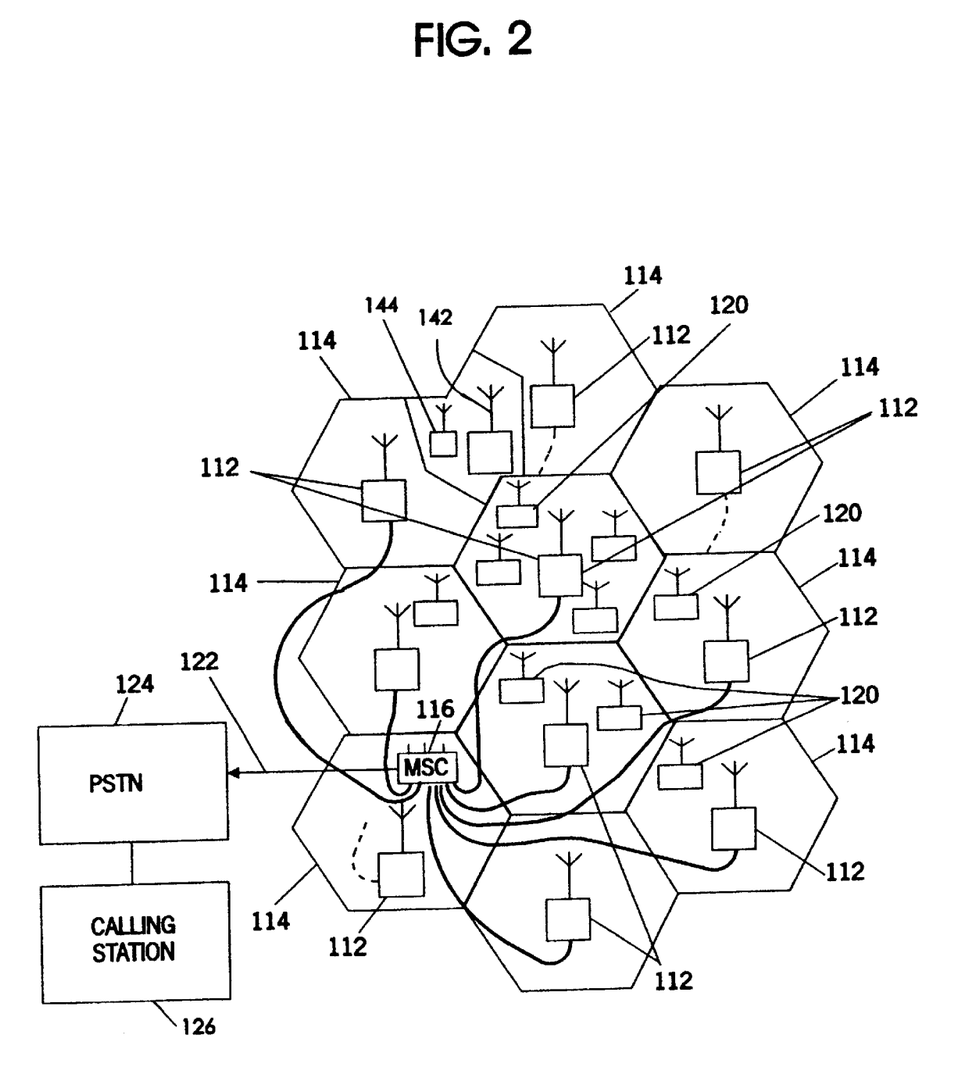
FIG. 2 is a graphical representation, similar to that shown in FIG. 1, but which illustrates the cellular communication network once an additional, fixed-site transceiver has been added according to the teachings of an embodiment of the present invention.

Again, the MSC 116 is coupled by way of lines 122 to a public service telephone network (PSTN) 124. A plurality of calling stations, such as the calling station 126 illustrated in the figure, are coupled to the PSTN 124 in conventional manner.

The illustration of the cellular communication system 100 shown in FIG. 2 differs with that shown in FIG. 1 in that an additional, radio base station 142 also forms a portion of the fixed network of the cellular communication system The additional radio base station 142 is also coupled to the MSC 116, again by way of a line 118. Because of the inclusion of the additional base station 142 into the infrastructure of the cellular communication system, communication between a mobile station, here identified by reference numeral 144, during its operation in the cellular communication system which would otherwise be with one of the pre-existing base stations 112 can instead occur with the additional radio base station 142.

Inclusion of the additional radio base station 142 effectively increases the capacity of the cellular communication system. Inclusion of the additional radio base station 142 into the cellular communication system 100 thereby permits an increased number of users to utilize the fixed network of the system at any particular time.

An embodiment of the present invention facilitates the placement into service of a radio base station, such as the radio base station 142, into an existing cellular communication system. Various embodiments of the present invention can also be utilized during formation of a newly-created cellular communication system, again to facilitate the placement into service of a radio base station therein. The need for technically-trained personnel to place the additional radio base station 142 into service is obviated as various embodiments of the present invention permit the additional radio base station to be automatically placed into service.

Figure 3:
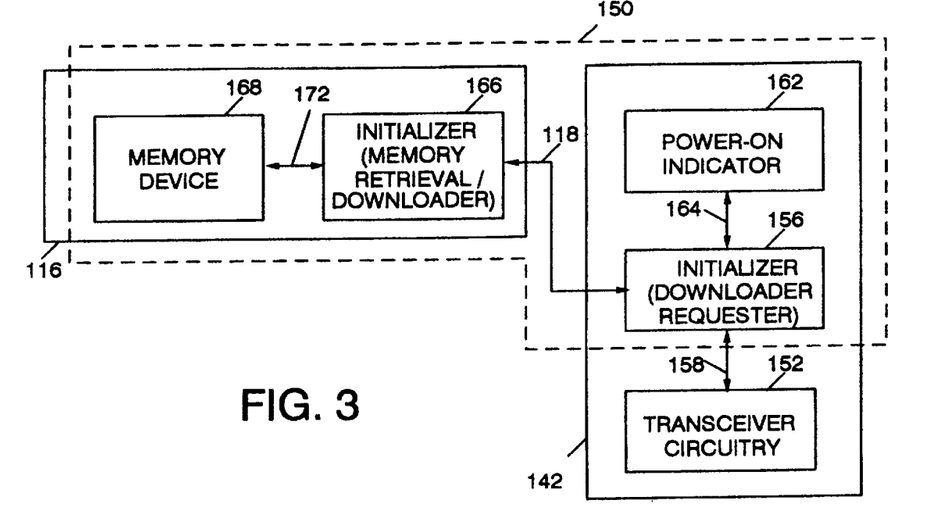
FIG. 3 is a functional block diagram of a portion of the fixed infrastructure of the cellular communication network shown in FIGS. 1 and 2, of which an embodiment of the present invention forms a portion.

FIG. 3 illustrates portions of the fixed infrastructure of the cellular communication system shown in FIG. 2 and in which the apparatus 150 is embodied. The apparatus 150 comprises the elements positioned within the block, shown in dash, in the figure.

More particularly, portions of the MSC 116 and the additional radio base station 142 are again illustrated in FIG. 3. As described previously, the additional radio base station 142 is formed of a fixed-site transceiver capable of two-way communication with one or more mobile stations, such as the mobile stations 120 and 144 illustrated in FIG. 2.

The apparatus 150 includes a first portion positioned at the radio base station 142 and a second portion positioned at the MSC 116. The first and second portions of the apparatus 150 are coupled theretogether, here again by way of the lines 118 which otherwise couple the MSC and the radio base station together.

The radio base station 142 includes transceiver circuitry 152, conventional in nature, and operable to generate and to receive radio frequency signals. The radio frequency signals generated and received by the transceiver circuitry 152 can, for example, be formed of conventional, analog signals, narrowband, analog signals, or digitally-modulated signals. As mentioned previously, prior to placement of the radio base station 142 into service, certain parameters of the base station must be set to permit proper transmission and reception of the radio frequency signals by the transceiver circuitry. The apparatus 150 permits the parameters to be automatically set without the need for manual setting of the parameters by technical personnel.

The portion of the apparatus 150 positioned at the radio base station 142 includes an initializer portion 156. The initializer portion 156 is coupled to the transceiver circuitry 152 by way of lines 158. In one embodiment, the initializer portion 156 is formed of processing circuitry having algorithms executable therein. In other embodiments, the initializer portion 156 may instead be formed of other types of circuitry.

The initializer portion 156 is coupled to a power-on indicator 162 by way of lines 164. The power-on indicator 162 indicates times in which the radio base station is powered to permit its operation. Indications of times in which the radio base station is, or becomes, powered, are generated on the line 164 to be supplied to the initializer portions 156. When the initializer portion 156 receives indications that the radio base station 142 has been powered, the initializer causes the generation of a download request signal on the lines 118 to an initializer portion 166.

The initializer portion 166 is positioned at the MSC 116 and, similar to the initializer portion 156 located at the radio base station 142, is also, in one embodiment, formed of processing circuitry having algorithms executable therein. In other embodiments, the initializer portion 166 may instead be formed of other circuitry.

The initializer portion 166 is coupled to a memory device 168 by way of lines 172. When the initializer portion 166 receives a download request generated by the initializer portion 156, the initializer portion 166 retrieves data stored at the memory device 168 and generates signals representative of the retrieved data on the lines 118 which are transmitted back to the initializer portion 156. The values of the downloaded data received by the initializer portion 156 are used as configuration data to set the parameters with the downloaded data, thereby to initialize and to permit operation of the radio base station 142.

The download request is generated automatically responsive to an indication of at least initial powering of the base station 142, and the data stored at the memory device 168 is automatically downloaded to the initializer portion 156 responsive to the download request. Initialization of the base station by setting of the parameters required for operation of the radio base station 142 is therefore automated. As the setting of the parameters required to place the radio base station 142 into service occurs automatically, technically-trained personnel are not required to manually set the base station with the parameters.

The data stored at the memory device 168 is set to be of values appropriate for the cellular communication system of which the MSC 116 forms a portion. Thereby, when the parameters of the radio base station 142 are downloaded to the radio base station, the radio base station is automatically set to facilitate its operation in the cellular communication system. In one embodiment, parameters to which the radio base station 142 are set cause the radio base station 142 to define a micro- or pico-cell of small geographical area. Thereafter, the values of the parameters can be fine-tuned, as desired.

Figure 4:
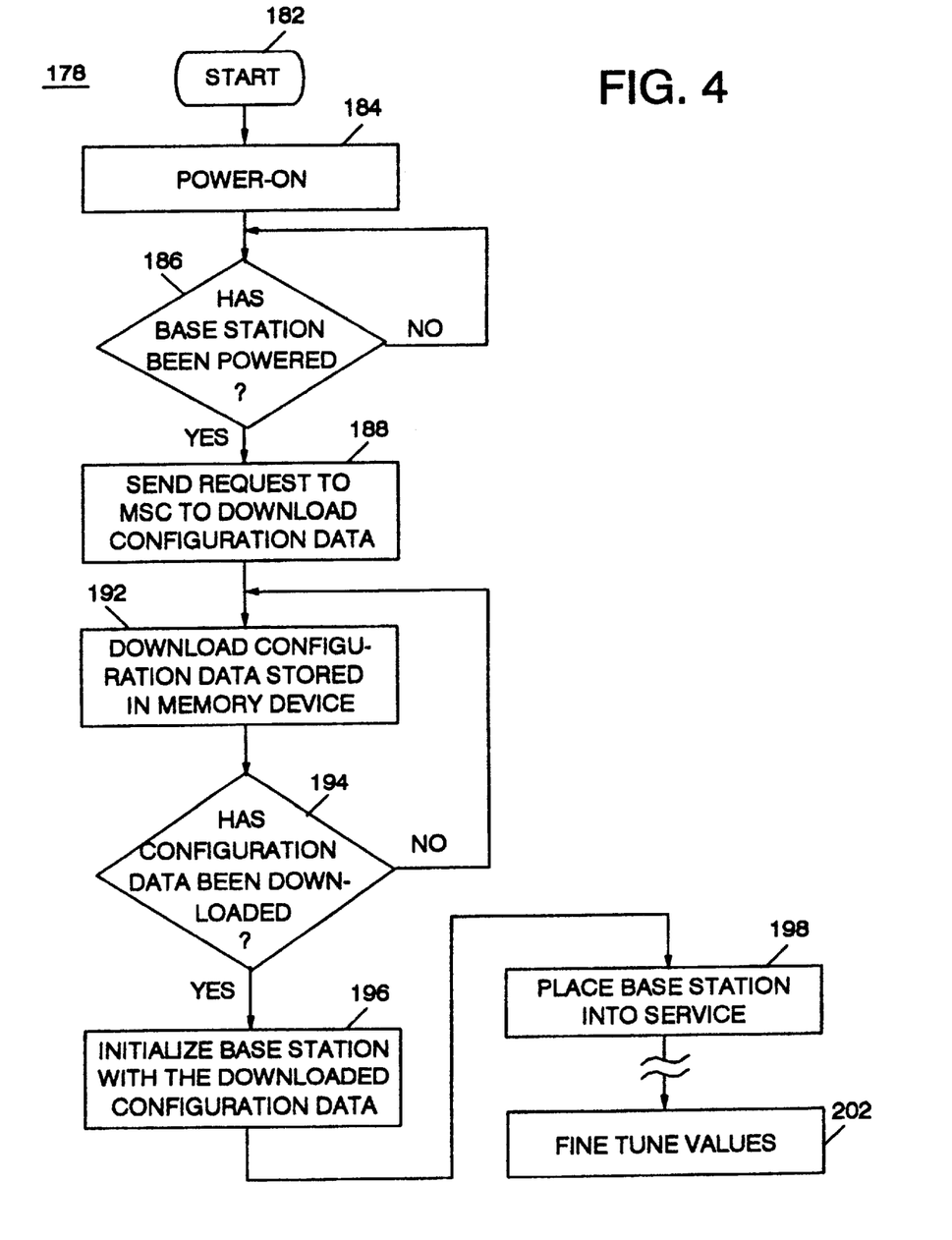
FIG. 4 is a flow diagram which illustrates operation of the embodiment of the present invention forming a portion of the cellular communication network shown in FIG. 3.

FIG. 4 illustrates a method, shown generally at 178, which illustrates operation of the apparatus 150 shown in FIG. 3. The method 58 permits a radio base station to be placed into service automatically once the base station has been installed into position in a cellular communication network.

After entry, indicated by the start block 182, power is applied to the radio base station, as indicated by the block 184. Then, at the decision block 186, a determination is made as to whether the base station has been appropriately powered. If not, the no branch is taken back to block 184. Otherwise, the yes branch to the block 188 and a request is sent to the MSC to download the configuration data stored at the memory device 168 of the MSC. Responsive to such requests, and as indicated by the block 192, the configuration data stored at the memory device is downloaded.

Thereafter, and as indicated by the decision block 194, a determination is made as to whether the configuration data has been downloaded. If not, the no branch is taken back to the block 192. Otherwise, the yes branch is taken, and the base station is initialized with the downloaded configuration data, as indicated by the block 196. Once the radio base station has been initialized with the downloaded configuration data, the base station is placed into service in the cellular network, as indicated by the block 198.

After the radio base station has been placed into service, the values of the parameters to which the radio base station has been set can be fine-tuned, as indicated by the block 202, if desired. As the parameters are set automatically, manual setting of the base station with the parameters is obviated.

Figure 5:
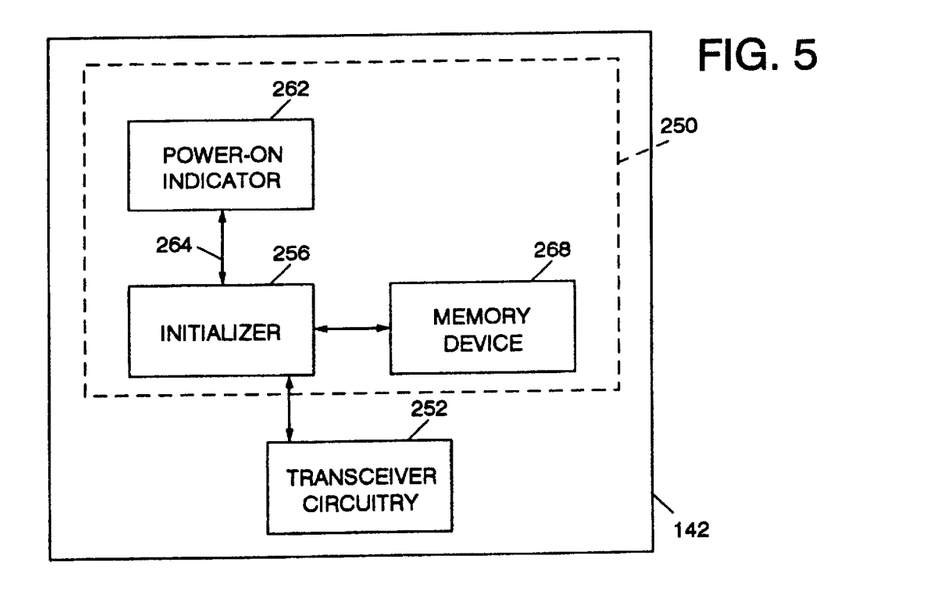
FIG. 5 is a functional block diagram illustrating a fixed-site transceiver of an embodiment of the present invention.

FIG. 5 illustrates the radio base station 142 of another embodiment of the present invention. The radio base station 142 includes apparatus 250, formed of the elements positioned within the block shown in dash in the figure, as a portion thereof.

The radio base station 142 is again shown to include transceiver circuitry, here transceiver circuitry 252, operative to generate and to receive radio frequency signals. Again, the transceiver circuitry can be constructed to receive and to generate signals of a desired communication system such as a conventional, analog system, a narrowband system, or a digital system.

In contrast to the apparatus 150 shown in FIG. 3, the apparatus 250 is located entirely at the radio base station. Booting of the base station does not require that configuration data be retrieved from a remotely-positioned MSC.

The apparatus 250 includes an initializer 256 which is coupled to the transceiver circuitry by way of lines 258. A power-on indicator 262 also forms a portion of the apparatus 250 and is coupled to the initializer 256 by way of the lines 264.

The power-on indicator 262 is operative to indicate times in which the radio base station is, or becomes, powered and to generate signals representative of such indications on the lines 264. When the indications of the powering of the radio base station are received by the initializer, the initializer retrieves configuration data stored at the memory device 268 which is coupled to the initializer by way of the lines 272. Once the configuration data has been retrieved, the initializer downloads the configuration data to the transceiver circuitry 252 to set the parameters required for operation of the base station 142.

Because the memory device at which the configuration data is stored is positioned at the radio base station, the entire circuitry required to set the parameters of the base station to permit the placement into service of the base station is located at the base station. Retrieval of the configuration data does not require access to circuitry located at the MSC. Generic configuration data can be stored at the memory device 268 during manufacture and assembly of the radio base station, and such configuration data can be utilized to place the radio base station into service once installed into a cellular network.

Figures 6, 7:
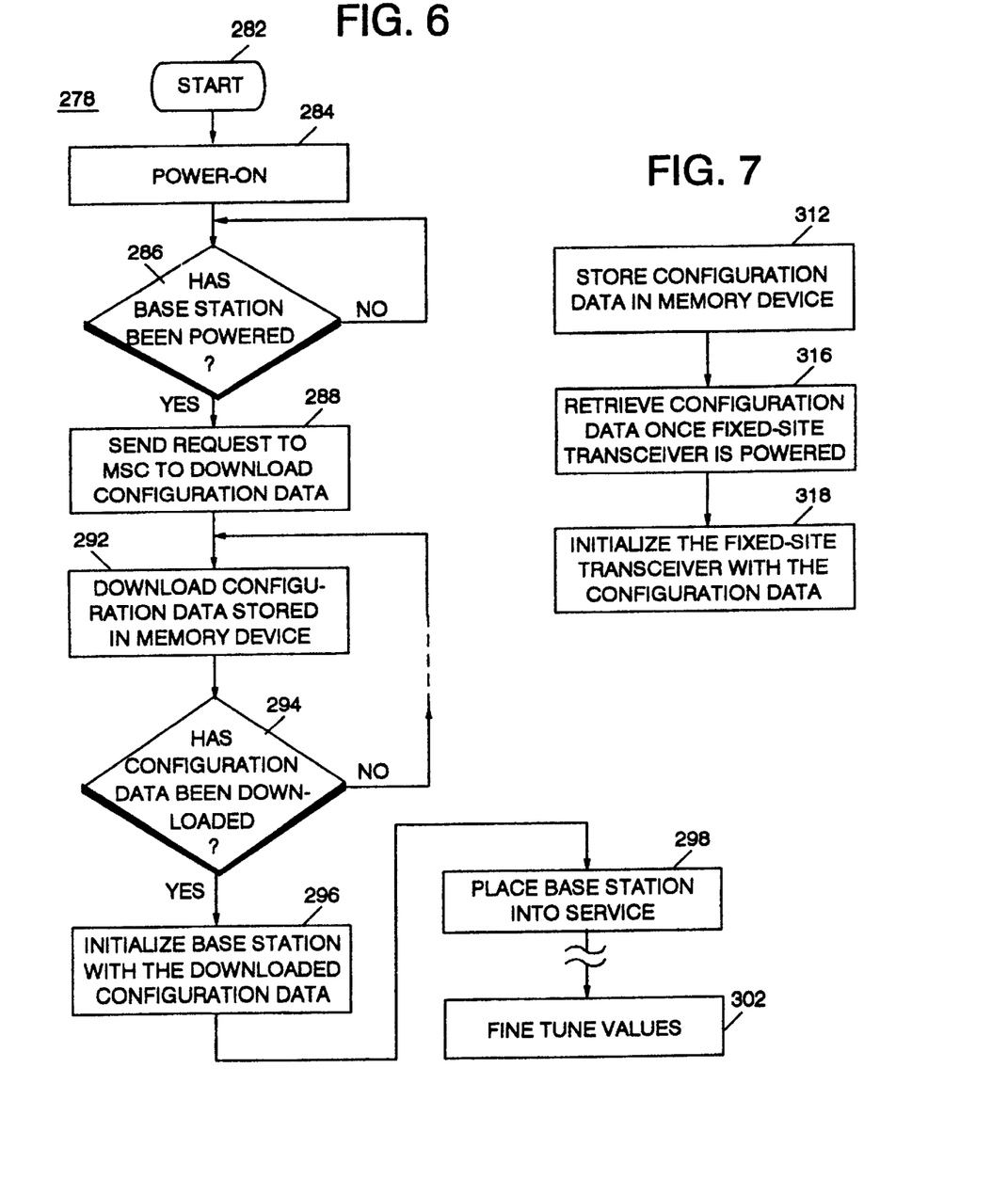
FIG. 6 is a flow diagram which illustrates the operation of the fixed-site transceiver shown in FIG. 5 to place the transceiver into service once installed in a cellular communication network.
FIG. 7 is a logical flow diagram listing the method steps of an embodiment of the present invention.

FIG. 6 illustrates a method, shown generally at 278, of the method of operation of the apparatus 250 shown in FIG. 5. The method 278 permits a radio base station installed in a cellular network to be placed into service automatically, without requiring personnel to manually place the base station into service.

First, after entry indicated by the start block 282, the radio base station is powered, as indicated by the block 284. Thereafter, and as indicated by the decision block 286, a determination is made as to whether the base station has been properly powered. If not, the no branch is taken back to block 284. Otherwise, the yes branch is taken to block 288 and the configuration data is retrieved from the memory device located at the radio base station. Once retrieved, the data is downloaded, as indicated by the block 292, to set the parameters required to permit operation of the radio base station.

Thereafter, a determination is made, as indicated by the decision block 294, as to whether the configuration data has been properly downloaded. If not, the no branch is taken back to block 292. Otherwise, the yes branch is taken to block 296 and the base station is initialized with the downloaded configuration data. Thereafter, and as indicated by the block 298, the base station is placed into service in the network in which the base station has been installed. Thereafter, as indicated by the block 302, the values to which the parameters have been set can be fine-tuned, if desired.

FIG. 7 illustrates the method steps of a method, shown generally at 310, of an embodiment of the present invention. The method places a fixed-transceiver into service once installed in a wireless communication network. First, and as indicated by block 312, configuration data is stored in a memory device. The configuration data stored in the memory device is data which is required to initialize operation of the transceiver in the wireless communication network.

Next, and as indicated by the block 316, when the fixed-site transceiver is powered-up, the configuration data stored in the memory device is retrieved. Then, and as indicated by the block 318, the fixed-site transceiver is initialized with the configuration data such that, once initialized with the configuration data, the transceiver becomes operative to transmit signals to, and receive signals from, a wireless communication station.

Because the radio base station can be configured with configuration data required prior to placement of the radio base station into service, the costs and delays associated with manual configuration of the radio base station are avoided. When the configuration data is stored, either at a mobile switching center or at the base station, retrieval and downloading of the data occurs automatically upon powering-on of the base station.

The previous descriptions of preferred examples for implementing the invention, and the scope of the invention should not necessarily be limited by this description. The scope of the present invention is defined by the following claims.

What is claimed is:

1. A wireless communication network, comprising:
   a fixed-site transceiver for communicating with a remotely-positioned wireless communication station;
   an apparatus for placing said fixed-site transceiver into service once installed in the wireless communication network, said apparatus including a signal path which is positioned in said fixed-site transceiver and which provides an indication when said fixed-site transceiver has been powered-on, a memory device having stored therein configuration data required to initialize operation of said fixed-site transceiver in the wireless communication network to permit said fixed-site transceiver to communicate with the remotely-positioned wireless communication station, said configuration data stored in said memory device before said powering-on of said fixed-site transceiver, said apparatus including an initializer coupled to said signal path and said memory device and said fixed-site transceiver, said initializer responsive to said indication from said signal path for automatically initiating execution of a procedure that automatically obtains the configuration data from said memory device and automatically initializes said fixed-site transceiver with the configuration data obtained; and
   said fixed-site transceiver, once automatically initialized with the configuration data, operable to transmit signals to and receive signals from the remotely-positioned wireless communication station.

2. The network of claim 1, including a switching center coupled to said fixed-site transceiver, said memory device positioned at said switching center.

3. The network of claim 1, wherein said memory device is positioned at said fixed-site transceiver.

4. The network of claim 1, wherein the configuration data comprises default configuration data for configuring said fixed-site transceiver in a default configuration.

5. The network of claim 1, wherein said wireless communication network forms a cellular communication network and wherein the configuration data comprises small cell configuration data for configuring said fixed-site transceiver in a small cell configuration.

6. The network of claim 1, wherein said initializer is formed of a first initializer portion and a second initializer portion, said first initializer portion positioned at said fixed-site transceiver and said second initializer portion positioned externally of said fixed-site transceiver and coupled to said first initializer portion.

7. The network of claim 6, including a switching center coupled to said fixed-site transceiver, said second initializer portion positioned at said switching center.

8. The network of claim 6, wherein said first initializer portion is coupled to said signal path to receive therefrom said indication, and wherein said first initializer portion informs said second initializer portion of said indication.

9. The network of claim 8, wherein said second initializer portion is coupled to said memory device to retrieve therefrom the configuration data and download the configuration data to said first initializer portion in response to being informed of said indication by said first initializer portion.

10. The network of claim 1, wherein said initializer includes processing circuitry having algorithms executable therein for initializing said fixed-site transceiver with the configuration data.

11. A fixed-site transceiver for communication with a remotely-positioned wireless communication station in a wireless communication network, comprising:

transceiver circuitry for transmitting signals to and receiving signals from the remotely-positioned wireless communication station;

a signal path that provides an indication when said fixed-site transceiver has been powered-on;

a memory device having stored therein configuration data required to initialize operation of said transceiver circuitry in the wireless communication network to permit communication with the remotely-positioned wireless communication station, said configuration data stored in said memory device before said powering-on of said fixed-site transceiver;

an initializer coupled to said signal path and said memory device and said transceiver circuitry, said initializer responsive to said indication from said signal path for automatically initiating execution of a procedure that automatically obtains the configuration data from said memory device and automatically initializes said transceiver circuitry with the configuration data obtained; and     said transceiver circuitry, once automatically initialized with the configuration data, operable to transmit signals to and receive signals from the remotely-positioned wireless communication station.

12. The fixed-site transceiver of claim 11, wherein the configuration data includes default configuration data for configuring said fixed-site transceiver in a default configuration.

13. The fixed-site transceiver of claim 11, wherein the configuration data includes configuration data for configuring said fixed-site transceiver for operation in a cellular communication network.

14. The fixed-site transceiver of claim 11, wherein said initializer includes processing circuitry having algorithms executable therein for initializing said fixed-site transceiver with the configuration data.

15. A method for placing a fixed-site transceiver into service once installed in a wireless communication network, the fixed-site transceiver operable once placed into service for communicating with a remotely-positioned wireless communication station, said method comprising:

storing in a memory device configuration data required to initialize operation of the transceiver in the wireless communication network to permit communication with the remotely-positioned wireless communication station;

thereafter, powering-on the transceiver, and using the transceiver to indicate when said powering-on step has occurred;

responsive to said transceiver indication that said powering-on step has occurred, automatically initiating execution of a procedure that obtains the configuration data from the memory device; and     automatically initializing the fixed-site transceiver with the configuration data obtained such that, once automatically initialized with the configuration data, the transceiver becomes operative to transmit signals to and receive signals from the remotely-positioned wireless communication station.

16. The method of claim 15, including, after said initializing step, operating the fixed-site transceiver in the wireless communication network.

17. The method of claim 15, including fine-tuning values of the configuration data after said initializing step.

* * * * *

UNITED STATES PATENT AND TRADEMARK OFFICE
CERTIFICATE OF CORRECTION

PATENT NO : 5,974,322
DATED : October 26, 1999
INVENTOR(S): Carlsson et al.

It is certified that error appears in the above-identified patent and that said Letters Patent are hereby corrected as shown below:

Column 3, lines 1-2     Before "additional"
delete --personnel have been required
to set the parameters of the--

Signed and Sealed this

Twenty-second Day of May, 2001

NICHOLAS P. GODICI

Attest:

Attesting Officer     Acting Director of the United States Patent and Trademark Office